Aug. 11, 1931.  G. T. MAX  1,818,808
ELECTRIC WATER HEATER
Filed May 31, 1930
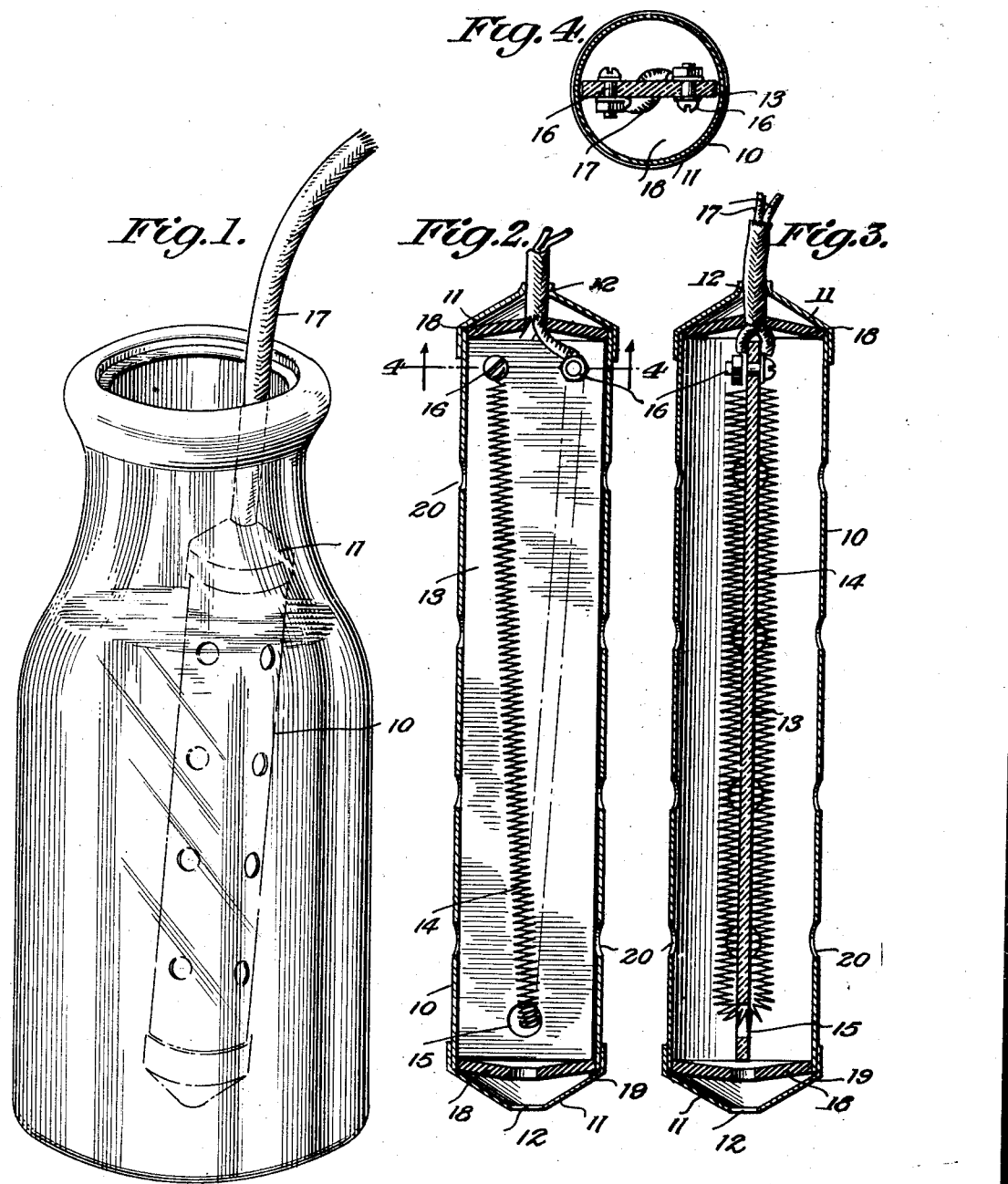
George T. Max
INVENTOR
BY Victor J. Evans
ATTORNEY Patented Aug. 11, 1931

1,818,808

UNITED STATES PATENT OFFICE

GEORGE T. MAX, OF FORT WORTH, TEXAS, ASSIGNOR TO REX MANUFACTURING COMPANY, OF FORT WORTH, TEXAS

ELECTRIC WATER HEATER

Application filed May 31, 1930. Serial No. 458,121.

This invention relates to water heaters, an object being to provide an electric heating device which may be immersed in water or other liquid and connected with a source of current to economically heat the liquid without heating or conveying the current to the liquid container.

Another object of the invention is the provision of an electric heater which will radiate heat in four different directions, so as to heat a given amount of water in a relatively short time, and at a minimum cost.

Another object of the invention is the provision of a heater which may be placed within a milk bottle, hot water bag, or other container having a restricted opening, so that the liquid may be heated in the container in which it is used, and thus eliminate the necessity of transferring the liquid to another container after heating.

Another object of the invention is the provision of a heater which is simple in construction, efficient and reliable in use and may be manufactured and sold at a nominal cost.

With the above and other objects in view, the invention further includes the following novel features and details of construction, to be hereinafter more fully described, illustrated in the accompanying drawings and pointed out in the appended claims.

In the drawings:—

Figure 1 is a perspective view illustrating the heater in use.

Figure 2 is a longitudinal sectional view of the heater per se.

Figure 3 is a similar view taken at right-angles to Figure 2.

Figure 4 is a section on the line 4—4 of Figure 2.

Referring to the drawings in detail wherein like characters of reference denote corresponding parts, the reference character 10 indicates the shell or casing of the heater which is preferably cylindrical and of a size to permit of its insertion within a milk bottle, hot water bag, or other container having a restricted mouth. The casing is provided at each end with tapered caps 11 having openings 12 therein, and positioned within the casing is an insulating panel 13. This panel is made of any suitable stiff material and carries a resistance element 14. This element 14 extends through an opening 15 provided at one end of the panel and the ends of the resistance element are secured to binding posts 16 which extend through the panel 13. Conductor wires 17 extend through the opening 12 at one end of the casing and are connected to the binding posts 16, whereby the resistance element may be connected with a suitable source of current.

Located within opposite ends of the casing are compressible disks 18. These disks are of a diameter slightly in excess of the diameter of the inside of the casing 10, so that these disks when in position will be substantially dish-shaped with the ends of the panel 13 bearing against the outer portions of the disks and compressing these disks between the panel and shoulders 19 provided within the inclined walls of the caps 11. The panel 13 will thus be securely held in place in a manner to permit of the heater being readily assembled. The panel 13 will thus have a tight fit within the casing without requiring undue care in manufacture or assembling, so that the cost of manufacture will be materially reduced.

The shell or casing 10 is provided with openings 20, and these openings are arranged in diametrical pairs, with the pairs of the inner row of openings disposed at an angle of ninety degrees to the pairs in the other row. The heat may thus radiate in four different directions, so as to quickly and economically heat the liquid. As the resistance element 14 is effectually insulated from the casing 10, the liquid container will not receive any current.

The invention is susceptible of various changes in its form, proportions and minor details of construction and the right is herein reserved to make such changes as properly fall within the scope of the appended claims.

Having described the invention what is claimed is:—

1. In a water heater, a casing having openings therein, tapered end closures for the casing, said closures having openings at their apices, an insulating panel extending centrally and longitudinally of the casing, a resistance element mounted upon the panel, compressible disks having openings therein and located at opposite ends of the casing for engagement by the ends of the panel to securely hold the panel in position, and conductor wires extending through one end of the casing and having electrical connection with the resistance element.

2. In a water heater, a casing having openings therein, tapered end closures for the casing, said closures having openings at their apices, an insulating panel extending centrally and longitudinally of the casing, a resistance element extending through one end of the panel and having its ends secured at opposite sides of the other end of the panel, compressible disks having openings therein and located at oposite ends of the casing for engagement by the ends of the panel to securely hold the panel in position, and conductor wires extending through one end of the casing and connected with the ends of the resistance element.

In testimony whereof I affix my signature.

GEORGE T. MAX.